United States Patent
Shimokita et al.

(10) Patent No.: US 9,742,002 B2
(45) Date of Patent: Aug. 22, 2017

(54) POSITIVE ELECTRODE COMPOSITION FOR NONAQUEOUS ELECTROLYTE SECONDARY BATTERY

(71) Applicants: Kousuke Shimokita, Anan (JP); Kenta Kawai, Anan (JP); Kiyofumi Inouchi, Anan (JP)

(72) Inventors: Kousuke Shimokita, Anan (JP); Kenta Kawai, Anan (JP); Kiyofumi Inouchi, Anan (JP)

(73) Assignee: NICHIA CORPORATION, Anan-Shi (JP)

(*) Notice: Subject to any disclaimer, the term of this patent is extended or adjusted under 35 U.S.C. 154(b) by 325 days.

(21) Appl. No.: 13/863,887

(22) Filed: Apr. 16, 2013

(65) Prior Publication Data

US 2013/0277604 A1 Oct. 24, 2013

(30) Foreign Application Priority Data

Apr. 18, 2012 (JP) .............. P 2012-094305
Apr. 5, 2013 (JP) .............. P 2013-079800

(51) Int. Cl.
*H01M 4/36* (2006.01)
*H01M 4/485* (2010.01)
(Continued)

(52) U.S. Cl.
CPC .......... *H01M 4/362* (2013.01); *H01M 4/366* (2013.01); *H01M 4/485* (2013.01); *H01M 4/505* (2013.01);
(Continued)

(58) Field of Classification Search
CPC ........ H01M 4/362; H01M 4/62; H01M 4/485; H01M 4/505; H01M 4/525; H01M 4/366;
(Continued)

(56) References Cited

U.S. PATENT DOCUMENTS

2002/0071990 A1 6/2002 Kweon et al.
2004/0018429 A1 1/2004 Kweon et al.
(Continued)

FOREIGN PATENT DOCUMENTS

EP 1 195 825 A2 4/2002
JP 10-079244 A 3/1998
(Continued)

OTHER PUBLICATIONS

English Translation of JP-2001257003.*
(Continued)

*Primary Examiner* — Peter F Godenschwager
*Assistant Examiner* — Andrew J Oyer
(74) *Attorney, Agent, or Firm* — Foley & Lardner LLP (57) ABSTRACT

A positive electrode composition for nonaqueous electrolyte secondary battery comprises a lithium transition metal complex oxide represented by a general formula $Li_aNi_{1-x-y}Co_xM^1_yW_zM^2_wO_2$, where $1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$, $M^1$ represents at least one selected from the group consisting of Mn and Al, and $M^2$ represents at least one selected from the group consisting of Zr, Ti, Mg, Ta, Nb and Mo; and a boron compound comprising at least boron element and oxygen element.

10 Claims, 5 Drawing Sheets

(51) Int. Cl.
*H01M 4/525* (2010.01)
*H01M 4/62* (2006.01)
*H01M 4/505* (2010.01)
*H01M 10/0525* (2010.01)

(52) U.S. Cl.
CPC ............ *H01M 4/525* (2013.01); *H01M 4/62* (2013.01); *H01M 10/0525* (2013.01)

(58) Field of Classification Search
CPC ............ H01M 10/0525; Y02T 10/7011; Y02E 60/122
See application file for complete search history.

(56) References Cited

U.S. PATENT DOCUMENTS

| | | |
|---|---|---|
| 2006/0246352 A1 | 11/2006 | Kweon et al. |
| 2011/0003200 A1 | 1/2011 | Shizuka et al. |
| 2011/0042609 A1 | 2/2011 | Park et al. |
| 2011/0123865 A1 | 5/2011 | Kepler et al. |
| 2011/0315918 A1 | 12/2011 | Kawai et al. |
| 2013/0146807 A1* | 6/2013 | Katsu et al. ............... 252/182.1 |

FOREIGN PATENT DOCUMENTS

| | | | |
|---|---|---|---|
| JP | 2000-113884 A | | 4/2000 |
| JP | 2000-315502 A | | 11/2000 |
| JP | 2001-257003 A | | 9/2001 |
| JP | 2001257003 | * | 9/2001 |
| JP | 2002-124262 A | | 4/2002 |
| JP | 2005-251716 A | | 9/2005 |
| JP | 2009-146739 A | | 7/2009 |
| JP | 2009146739 | * | 7/2009 |
| JP | 2009-289758 A | | 12/2009 |
| JP | 2010-040383 A | | 2/2010 |
| JP | 2011-108554 A | | 6/2011 |

OTHER PUBLICATIONS

English Translation of JP 2009146739.*
EP Communication dated Aug. 20, 2013 with European Search Report for Application No. 13164093.0.
Observations by a Third Party dated Jul. 22, 2015 received in European Application No. 13164093.0.
Office Action issued in Japanese Patent Application No. 2013-079800, dated Sep. 13, 2016.

* cited by examiner

POSITIVE ELECTRODE COMPOSITION FOR NONAQUEOUS ELECTROLYTE SECONDARY BATTERY

TECHNICAL FIELD

The present invention relates to a positive electrode composition for a nonaqueous electrolyte secondary battery such as a lithium ion secondary battery. In particular, the present invention relates to a positive electrode composition that can improve output power characteristics of a battery, and can also improve cycling characteristics of a battery and viscosity stability of a positive electrode slurry.

BACKGROUND ART

With the progress in spread and miniaturization of mobile devices such as VTR, mobile phone and note PC, a non-aqueous electrolyte secondary battery such as a lithium ion secondary battery has recently been used as a power supply therefor. Furthermore, in order to cope with recent environmental problems, the nonaqueous electrolyte secondary battery has also attracted interest as a power battery of an electric vehicle or the like.

Commonly, there has widely been used, as a positive electrode active material for a lithium ion secondary battery, $LiCoO_2$ (lithium cobalt oxide) that can constitutes a 4 V-class secondary battery. When $LiCoO_2$ is used as the positive electrode active material, it is put in practical use at a discharge capacity of about 160 mA/g.

Cobalt as a raw material of $LiCoO_2$ is a scarce resource, which leads to high costs, and cobalt is unevenly distributed, which may cause anxiety about supply of a raw material.

In response to these circumstances, lithium transition metal complex oxide having a layered structure, such as lithium nickel cobalt manganese oxide obtained by substituting Co in $LiCoO_2$ with one or more elements such as Ni and Mn has been developed. Generally, with respect to lithium transition metal complex oxide having a layered structure, its crystal structure becomes unstable when it has higher nickel ratio, and thus, it tends to cause precipitation of lithium compound in a positive electrode slurry upon manufacturing a positive electrode. In addition, when a cobalt ratio in the lithium transition metal complex oxide is decreased, the output power characteristics tend to be reduced.

By the way, there are techniques of selecting metal(s) such as tungsten as a substitution element depending on various purposes.

Patent document 1 discloses a technique of reducing a resistance of a positive electrode active material itself by adding one or more elements such as molybdenum and tungsten in lithium cobalt oxide and lithium nickel oxide.

Patent document 2 discloses lithium transition metal complex oxide in which up to about 20% of nickel in lithium nickel oxide is substituted with manganese, cobalt and the like, and up to about 10% of nickel is further substituted with tantalum, niobium, tungsten, molybdenum and the like. Patent document 2 describes that the lithium nickel oxide having a specific composition substituted with at least two elements in this manner exhibits improved thermal stability upon charging, and improved safety upon an internal short-circuit because of its lower electric conductivity in the form of powders.

Patent Document 3 discloses a technique of increasing an electrode plate density as well as enhancing thermal stability and load characteristics by lithium transition metal complex oxide having molybdenum, tungsten, boron and the like on its surface. As an average composition of the specific lithium transition metal complex oxide, lithium nickel cobalt manganese oxide comprising molybdenum is disclosed.

Patent document 4 discloses a technique of improving crystallinity of lithium transition metal complex oxide with preventing a sintering in a calcination stage by involving boron and the like (additive element 1) and molybdenum, tungsten, niobium, tantalum and the like (additive element 2) therein, which lead to satisfy all of a cost, high voltage resistance, high safety, rate characteristics and output power characteristics, and prevent a decrease in bulk density and an increase in specific surface area of powders. Specifically, lithium nickel cobalt manganese oxide comprising two aforementioned additive elements is disclosed.

On the other hand, there are techniques of mixing boron compound such as boric acid with lithium transition metal complex oxide, or techniques of lithium transition metal complex oxide having boron compound on its surface.

Patent document 5 discloses a technique of suppressing a reaction of lithium manganese oxide which has spinel structure with hydrohalic acid and improving cycling characteristics because of a positive electrode using lithium manganese oxide which comprises boron compound soluble in an electrolyte, such as boron oxide, orthoboric acid, metaboric id and tetraboric acid.

Patent document 6 discloses a technique of increasing a discharge potential and improving a lifetime characteristics by forming on a surface of lithium transition metal complex oxide a surface treatment layer which exhibits excellent ion conductivity, the surface treatment layer comprising hydroxide, oxyhydroxide and the like of a coating element such as boron. As a specific coating method, it discloses that the coating element dissolved in a solvent is precipitated on the surface of lithium transition metal complex oxide followed by removing the solvent.

Patent document 7 discloses a technique of preventing a gelation of an electrode paste by involving boric acid and the like as inorganic acid in an electrode which uses lithium transition metal complex oxide and the like. As a specific example of the lithium transition metal complex oxide, lithium nickel oxide is disclosed.

Patent document 8 discloses a technique of providing higher capacity of a secondary battery and improved charge-discharge efficiency of the secondary battery by attaching borate compound and the like such as ammonium borate and lithium borate on a surface of the particles of lithium transition metal complex oxide comprising nickel or cobalt indispensably, and by performing heat treatment under oxidizing atmosphere. As a specific example of the lithium transition metal complex oxide, lithium nickel oxide in which a portion of nickel is substituted with cobalt and aluminum is disclosed.

In any of the above-described Patent documents 5 to 8, a positive electrode and lithium transition metal complex oxide comprising tungsten is not disclosed.

BACKGROUND ART DOCUMENT

Patent Document

Patent Document 1: JP 2000-113884 A
Patent Document 2: JP 2000-315502 A
Patent Document 3: JP 2005-251716 A
Patent Document 4: JP 2011-108554 A
Patent Document 5: JP 2001-257003 A
Patent Document 6: JP 2002-124262 A
Patent Document 7: JP 10-079244 A
Patent Document 8: JP 2009-146739 A

SUMMARY OF INVENTION

Technical Problem

As described in Patent document 4, output power characteristics of a battery can be improved by adding tungsten into lithium transition metal complex oxide. However, the present inventors have found that cycling characteristics tend to degrade when lithium transition metal complex oxide having a layered structure and comprising tungsten in its composition is used as a positive electrode active material.

Under these circumstances, the present invention has been made. An object of the present invention is to improve output power characteristics and cycling characteristics when lithium transition metal complex oxide having low content of cobalt or not comprising cobalt, and comprising nickel and tungsten is used in a positive electrode composition. In addition, an object of the present invention is to provide a method for producing a positive electrode composition which achieves such object.

Solution to Problem

In order to achieve the above objects, the present inventors have intensively studied, and thus the present invention has been completed. The present inventors have found that the output power characteristics and cycling characteristics can be improved in a positive electrode composition using lithium transition metal complex oxide having low content of cobalt or not comprising cobalt, by using a positive electrode composition comprising lithium transition metal complex oxide comprising nickel and tungsten indispensably and a particular boron compound. Furthermore, the present inventors have found that an increase in viscosity of positive electrode slurry is suppressed by using such positive electrode composition.

A positive electrode composition for nonaqueous electrolyte secondary battery of the present invention comprises:

a lithium transition metal complex oxide represented by a general formula $Li_aNi_{1-x-y}Co_xM^1{}_yW_zM^2{}_wO_2$ ($1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$, $M^1$ represents at least one selected from the group consisting of Mn and Al, $M^2$ represents at least one selected from the group consisting of Zr, Ti, Mg, Ta, Nb and Mo); and a boron compound comprising at least boron element and oxygen element.

A method for producing a positive electrode composition for nonaqueous electrolyte secondary battery of the present invention is a method for producing a positive electrode composition for nonaqueous electrolyte secondary battery comprising a lithium transition metal complex oxide represented by a general formula $Li_aNi_{1-x-y}Co_xM^1{}_yW_zM^2{}_wO_2$ ($1.0 \leq a \leq 1.5$, $0 \leq x \leq 0.5$, $0 \leq y \leq 0.05$, $0.002 \leq z \leq 0.03$, $0 \leq w \leq 0.02$, $0 \leq x+y \leq 0.7$, $M^1$ represents at least one selected from the group consisting of Mn and Al, $M^2$ represents at least one selected from the group consisting of Zr, Ti, Mg, Ta, Nb and Mo), and a boron compound comprising at least boron element and oxygen element, the method comprising at least:

synthesizing the lithium transition metal complex oxide; and mixing the lithium transition metal complex oxide obtained by the synthesis and a raw material compound of the boron compound to obtain a mixture.

Advantageous Effects of Invention

Since the positive electrode composition of the present invention has the aforementioned features, the output power characteristics and the cycling characteristics are improved. Furthermore, an increase in viscosity of positive electrode slurry can be suppressed by using the positive electrode composition of the present invention.

DESCRIPTION OF EMBODIMENTS

Hereinafter, a positive electrode composition of the present invention will be described in detail by reference to embodiments and Examples. However, the present invention is not limited to these embodiments and Examples.

A positive electrode composition of the present invention comprises a lithium transition metal complex oxide as described below and a boron compound comprising at least boron element and oxygen element.

[Lithium Transition Metal Complex Oxide]

The lithium transition metal complex oxide in the positive electrode composition of the present invention is represented by a general formula $Li_aNi_{1-x-y}Co_xM^1{}_yW_zM^2{}_wO_2$ ($1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$, $M^1$ represents at least one selected from the group consisting of Mn and Al, $M^2$ represents at least one selected from the group consisting of Zr, Ti, Mg, Ta, Nb and Mo).

The lithium transition metal complex oxide comprises nickel indispensably and further comprises tungsten. The lithium transition metal complex oxide in the positive electrode composition of the present invention can have a layered structure. Furthermore, a portion of nickel sites of the lithium transition metal complex oxide may be substituted with cobalt, manganese and/or aluminum. Alternatively, the lithium transition metal complex oxide may further comprise one or more elements other than tungsten.

By substituting a portion of nickel sites with cobalt, output power characteristics can be improved. The value of x is from 0 to 0.5. When the value of x is within the aforementioned range, cobalt ratio in the lithium transition metal complex oxide can be reduced or zero, and thus, the production cost can be reduced. Taking balance with various characteristics into consideration, the value of x is preferably from 0.05 to 0.35. In the composition formula of the lithium transition metal complex oxide, a, w, x, y and z mean a ratio of each element when the amount of nickel sites are regarded as 1.

By substituting a portion of nickel sites with at least one element ($M^1$) selected from the group consisting of manganese and aluminum, stability of the crystal structure of the obtained lithium transition metal complex oxide can be improved. The value of y is from 0 to 0.5. When the value of y is within the aforementioned range, excellent output power characteristics and charge-discharge characteristics can be obtained. In addition, the value of x+y (total substitution amount of the nickel sites, i.e., the sum of the substitution amount with cobalt and that with the element $M^1$) is from 0 to 0.7. When the value of x+y is within the aforementioned range, excellent charge-discharge characteristics can be obtained. Taking balance with various characteristics into consideration, the value of x+y is preferably from 0.2 to 0.6.

The lithium transition metal complex oxide in the positive electrode composition of the present invention comprises tungsten. Since the lithium transition metal complex oxide comprises tungsten, the output power characteristics of the nonaqueous electrolyte secondary battery can be improved. The value of z is from 0.002 to 0.03. When the value of z is 0.002 or more, excellent output power characteristics can be obtained. When the value of z is 0.03 or less, excellent cycling characteristics can be obtained, and furthermore, an effect in improving characteristics due to other element(s) contained in the lithium transition metal complex oxide are not hindered. Preferable range of the value of z is from 0.003 to 0.007.

The lithium transition metal complex oxide may further comprise at least one element ($M^2$) selected from the group consisting of zirconium, titanium, magnesium, tantalum, niobium and molybdenum. The value of w is from 0 to 0.02. When the value of w is within the aforementioned range, various purposes can be achieved without hindering the effects in improving characteristics due to other element(s) contained in the lithium transition metal complex oxide. For example, zirconium is suitable for improving storage characteristics, and titanium and magnesium are suitable for further improving cycling characteristics.

In the lithium transition metal complex oxide of the present invention, the value of a (the ratio of lithium element when the amount of nickel sites are regarded as 1) is from 1.0 to 1.5. When the value of a is 1.0 or more, excellent output power characteristics can be obtained. When the value of a is 1.05 or more, the effect in improving output power characteristics is more significant. When the value of a is 1.5 or less, lithium transition metal complex oxide can be readily synthesized. In addition, the obtained positive electrode composition can be readily handled since progression of sintering in the synthesis process can be suppressed. Taking a balance of characteristics, an ease of synthesis and the like into consideration, the value of a is preferably from 1.05 to 1.25.

[Boron Compound]

The boron compound in the positive electrode composition of the present invention comprises at least boron element and oxygen element. Generally, when a lithium transition metal complex oxide comprising tungsten is used as a positive electrode composition, tungsten tends to elute into an electrolyte in association with charge-discharge reaction, and a portion of the eluted tungsten tends to be precipitated on a negative electrode, which is considered to cause the degradation of cycling characteristics. In contrast, in the positive electrode composition of the present invention, the aforementioned boron compound preferentially reacts with tungsten which may be eluted from the lithium transition metal complex oxide. By this, the precipitation of tungsten on the negative electrode is suppressed, and as a result, the degradation of the cycling characteristic due to the elution of tungsten can be suppressed. The positive electrode composition of the present invention can improve the output power characteristics since it comprises lithium transition metal complex oxide comprising tungsten, and it can suppress the degradation of the cycling characteristics due to the elution of tungsten since it comprises the boron compound comprising at least boron element and oxygen element.

On the other hand, the increase in viscosity of the positive electrode slurry is considered to be caused by an elution of lithium from a lithium transition metal complex oxide in a positive electrode slurry. By the reaction of lithium eluted from the lithium transition metal complex oxide with a binder contained in the positive electrode slurry, the gelation of the positive electrode slurry occurs, and as a result, the viscosity of the positive electrode slurry is increased. In contrast, in the positive electrode composition of the present invention, the aforementioned boron compound preferentially reacts with lithium which may be eluted from the lithium transition metal complex oxide. By this, the reaction of lithium with the binder in the positive electrode slurry is suppressed, and as a result, the increase in viscosity of the positive electrode slurry can be suppressed. The present inventors have found that the aforementioned effects can be achieved when using the boron compound comprising at least boron element and oxygen element.

The aforementioned boron compound can be obtained by at least mixing the lithium transition metal complex oxide with a raw material compound of the boron compound. The raw material compound of the boron compound is described later. By obtaining the boron compound in this manner, the reaction of tungsten and/or lithium which may be eluted from the lithium transition metal complex oxide with the boron compound further readily occurs, and as a result, the output power characteristics can be further improved, and the increase in viscosity of the positive electrode slurry can be further suppressed.

At least portion of the boron compound preferably exists on or adjacent to the surface of the particles of the lithium transition metal complex oxide. In this case, the reaction of tungsten and/or lithium which may be eluted from the lithium transition metal complex oxide with the boron compound is considered to further readily occur, and as a result, it is considered that the output power characteristics can be further improved, and the increase in viscosity of the positive electrode slurry can be further suppressed. Furthermore, when at least portion of the boron compound is physically bonded to the lithium transition metal complex oxide via for example, van der Waals force, electrostatic force and the like, the elution of tungsten and/or lithium itself is assumed to be less likely to occur. At least portion of the boron compound is preferably attached on the surface of the particles of the lithium transition metal complex oxide. Alternatively, at least portion of the boron compound preferably covers at least partially the surface of the particles of the lithium transition metal complex oxide.

In addition, it is preferable that at least portion of the boron compound is chemically bonded to one or more elements constituting the lithium transition metal complex oxide. This chemical bonding is formed by a reaction of at least portion of the raw material compound of the boron compound with one or more elements (such as lithium) constituting the lithium transition metal complex oxide.

Although the detail of this chemical bonding is unknown, it is assumed that, for example, at least portion of the raw material compound of the boron compound reacts with a portion of elements such as lithium in the lithium transition metal complex oxide to form complex oxide. When at least portion of the boron compound forms the chemical bonding with the elements constituting the lithium transition metal complex oxide, the elution of tungsten and/or lithium itself is assumed to be less likely to occur.

In addition, when the aforementioned physical and/or chemical bonding is formed between the boron compound and the lithium transition metal complex oxide, it is considered that lithium ion conductivity of the entire positive electrode composition becomes higher, and as a result, the output power characteristics can be further improved.

Furthermore, in the positive electrode composition of the present invention, the boron compound is preferably obtained by mixing the lithium transition metal complex oxide with the raw material compound of the boron compound followed by calcining. By the calcination, the formation of the physical and/or chemical bonding between the boron compound and the lithium transition metal complex oxide can be facilitated. In addition, by the calcination, moisture and/or hydration water which may be present in the boron compound can be removed, and as a result, the degradation of the characteristics due to moisture and/or hydration water can be suppressed. Calcination temperature in the calcining is preferably 450° C. or less. Calcination conditions such as calcination temperature are described later.

In the positive electrode composition of the present invention, a ratio (molar percent) of the boron element to the lithium transition metal complex oxide is preferably 2.0 mol % or less. When the ratio of the boron element is 2.0 mol % or less, excellent charge-discharge characteristics can be obtained. The ratio of the boron element is more preferably from 0.5 mol % to 1.5 mol %. When the ratio of the boron element is 0.5 mol % or more, the effect in suppressing the elution of tungsten and lithium is enhanced. In addition, when the ratio of the boron element is 1.5 mol % or less, the charge-discharge characteristics can be further improved. In the present specification, the ratio of the boron element to the lithium transition metal complex oxide in the positive electrode composition is also referred to as "boron content."

The raw material compound of the aforementioned boron compound comprises at least boron element and oxygen element. The raw material compound of the boron compound is preferably at least one selected from the group consisting of boron oxide, oxo-acids of boron and oxo-acid salts of boron since the finally obtained boron compound is in the suitable form for the objects of the present invention. The oxo-acid of boron and the oxo-acid salts of boron include orthoboric acid, metaboric acid, polyboric acids such as diboric acid and triboric acid, and salts of these oxo-acids. When the oxo-acid salts of boron are used as the raw material compound of the boron compound, lithium salt and/or ammonium salt of oxo-acids of boron is preferably used. By using the lithium salt and/or ammonium salt of oxo-acids of boron, the effects of the present invention can be achieved without impairing other battery properties. Specific examples of the raw material compound of the boron compound include lithium tetraborate ($Li_2B_4O_7$), ammonium pentaborate ($NH_4B_5O_8$) and the like. These raw material compounds of the boron compound may contain hydration water. The raw material compound of the boron compound is preferably oxo-acids of boron in respect of its handling and the form of the finally obtained boron compound. Orthoboric acid (hereinafter, it may be referred to as merely "boric acid") is particularly preferable.

In the positive electrode composition according to the present invention, it is considered that the positive electrode composition does not change its composition before and after the mixing and the calcining described above. In the positive electrode composition according to the present invention, at least portion of the boron compound is assumed to have the same composition as that of the raw material compound of the boron compound. In addition, at least portion of the boron compound may be a compound obtained by chemical reaction of the raw material compound of the boron compound with one or more elements constituting the lithium transition metal complex oxide. The boron compound obtained by such chemical reaction is considered to form a chemical bonding to one or more elements constituting the lithium transition metal complex oxide. The presence of this chemical bonding can be identified by, for example, X-ray photoelectron spectroscopy (XPS).

[Production of Positive Electrode Composition]

Next, a method for producing a positive electrode composition of the present invention is described. The method for producing a positive electrode composition comprises at least synthesizing a lithium transition metal complex oxide, and mixing the lithium transition metal complex oxide obtained by the synthesis and a raw material compound of the boron compound to obtain a mixture. Preferably, the method for producing the positive electrode composition further comprises calcining the mixture obtained by the mixing.

[Synthesis of Lithium Transition Metal Complex Oxide]

The lithium transition metal complex oxide can be synthesized by appropriately using known methods. The lithium transition metal complex oxide can be obtained by, for example, mixing the respective raw material compounds, which are degraded to oxides at higher temperature, to be a stoichiometric proportion of the composition of the targeted lithium transition metal complex oxide, and calcining the obtained mixed raw materials at about 700° C. to 1100° C. Alternatively, the lithium transition metal complex oxide may be obtained by dissolving in a solvent the respective raw material compounds, which are soluble in the solvent, to be a stoichiometric proportion of the composition of the targeted lithium transition metal complex oxide, adjusting temperature and/or pH and/or injecting a complexing agent to generate a precipitation of mixed raw materials, and calcining the obtained mixed raw materials at about 700° C. to 1100° C.

[Mixing]

Then, the lithium transition metal complex oxide obtained by the synthesis is mixed with the raw material compound of the boron compound. It is sufficient to perform the mixing using the existing mixer and the like to an extent that the both are mixed evenly. The mixing is preferably performed to an extent that a mechanochemical reaction occurs. The boron compound can be obtained in more preferable form by the mechanochemical reaction of the lithium transition metal complex oxide with the raw material compound of the boron compound. For example, at least portion of the boron compound can exist on the surface of the particles of the lithium transition metal complex oxide. In addition, at least portion of the boron compound can be physically bonded to the lithium transition metal complex oxide. Specifically, the boron compound can be attached on or cover at least partially the surface of the particles of the lithium transition metal complex oxide. In addition, by the mechanochemical reaction of the lithium transition metal complex oxide with the raw material compound of the boron compound, at least portion of the boron compound can form a chemical bonding, for example, complex oxide, with one or more elements (such as lithium) constituting the lithium transition metal complex oxide. It is considered that the average composition of the lithium transition metal complex oxide does not change before and after this reaction even if at least portion of the raw material compound of the boron compound reacts with one or more elements constituting the lithium transition metal complex oxide. As the raw material compound of the boron compound, at least one selected from the group consisting of boron oxide, oxo-acids of boron and oxo-acid salts of boron is preferably used as described above. When the oxo-acid salts of boron are used, lithium salt or ammonium salt thereof is preferable. As described above, oxo-acids of boron is more preferable as the raw material compound of the boron compound, and orthoboric acid is particularly preferable.

The lithium transition metal complex oxide and the raw material compound of the boron compound are preferably mixed such that the ratio of boron element to the lithium transition metal complex oxide is 2.0 mol % or less. By mixing in such ratio, the ratio of boron element in the boron compound to the lithium transition metal complex oxide in the obtained positive electrode composition can be set in 2.0 mol % or less.

The mixture obtained by mixing as described above can be used as the positive electrode composition of the present invention. The positive electrode composition obtained by the method of the present invention exhibits excellent output power characteristics and cycling characteristics. In addition, the increase in viscosity of the positive electrode slurry can be suppressed by using the positive electrode composition obtained by the method of the present invention.

[Calcination]

The formation of the physical and/or chemical bonding between the boron compound and the lithium transition metal complex oxide can be facilitated by further calcining the mixture obtained by the aforementioned mixing. As a result, the elution of tungsten and/or lithium from the lithium transition metal complex oxide is less likely to occur. In addition, lithium ion conductivity of the entire positive electrode composition becomes higher, and the output power characteristics are further improved. Furthermore, moisture and/or hydration water which may be present in the boron compound can be removed by calcining, and as a result, degradation of the characteristics due to moisture and/or hydration water can be suppressed.

The calcination temperature is preferably 450° C. or less, and more preferably 400° C. or less, and 200° C. or more. When the calcination temperature is 450° C. or less, or more preferably 400° C. or less, the lithium transition metal complex oxide can react with the raw material compound of the boron compound to an extent that the innate characteristics of the lithium transition metal complex oxide can be sufficiently exhibited. When the calcination temperature is 200° C. or more, the effects such as the suppression of eluting tungsten and lithium can be further enhanced.

[Nonaqueous Electrolyte Secondary Battery]

A nonaqueous electrolyte secondary battery according to the present invention uses the aforementioned positive electrode composition for its positive electrode. Components of the nonaqueous electrolyte secondary battery according to the present invention are not specifically limited, and the components known as those for nonaqueous electrolyte secondary batteries can be appropriately used. The nonaqueous electrolyte secondary battery according to the present invention can be appropriately prepared according to the known methods. An example of a configuration of the nonaqueous electrolyte secondary battery according to the present invention is described below; however, the present invention is not limited to the following configuration example.

In an example, the nonaqueous electrolyte secondary battery comprises a positive electrode, a negative electrode and a nonaqueous electrolyte.

The positive electrode is not specifically limited as long as it can be used in the nonaqueous electrolyte secondary battery. In an example, the positive electrode can be obtained by preparing a positive electrode slurry comprising at least the positive electrode composition of the present invention, applying the obtained positive electrode slurry on at least one side of a positive electrode collector, and drying the applied positive electrode slurry. The aforementioned positive electrode slurry may further comprise a conducting agent, a binder, a dispersion medium and the like. The conducting agent, the binder, the dispersion medium and the like can be appropriately selected depending on purposes. The obtained positive electrode may be appropriately compression-formed and cut into a given size.

The negative electrode is not specifically limited as long as it can be used in the nonaqueous electrolyte secondary battery. In an example, the negative electrode may be obtained by preparing a negative electrode slurry comprising at least a negative electrode active material, applying the obtained negative electrode slurry on at least one side of a negative electrode collector, and drying the applied negative electrode slurry. The aforementioned negative electrode slurry may further comprise a thickening agent, a binder, a dispersion medium and the like. The thickening agent, the binder, the dispersion medium and the like can be appropriately selected depending on purposes. The obtained negative electrode may be appropriately compression-formed and cut into a given size. The negative electrode active material is not specifically limited as long as it can be used as a negative electrode active material of nonaqueous electrolyte secondary batteries, and for example, carbon materials such as artificial graphite may be used.

The nonaqueous electrolyte is not specifically limited as long as it can be used for nonaqueous electrolyte secondary batteries. The nonaqueous electrolyte generally comprises a supporting electrolyte and a solvent. As the supporting electrolyte, for example, $LiBF_4$, $LiPF_6$ and the like can be used. As the solvent, carbonate-based solvents such as ethylene carbonate, methyl ethyl carbonate and the like can be used. For example, a mixed solvent obtained by mixing EC (ethylene carbonate) and MEC (methyl ethyl carbonate) in a volume ratio of 3:7. The concentration of the supporting electrolyte is not specifically limited, and may be from about 0.5 mol/l to about 1.5 mol/l.

A fabrication of the nonaqueous electrolyte secondary battery may be performed by known methods. In an example, the nonaqueous electrolyte secondary battery can be obtained by placing the aforementioned positive electrode and negative electrode opposed to each other via a separator, and encapsulating them together with the nonaqueous electrolyte in an outer package. The nonaqueous electrolyte secondary battery according to the present invention exhibits excellent output power characteristics and cycling characteristics.

EXAMPLES

Example 1

In a reaction vessel, pure water is prepared with stirring, and aqueous solutions of nickel sulfate, cobalt sulfate and manganese sulfate are added dropwise at a flow rate ratio such that a molar ratio of nickel, cobalt and manganese is Ni:Co:Mn=4:3:3. After completion of the dropwise addition, a liquid temperature is adjusted to 50° C. and a given amount of an aqueous sodium hydroxide solution is added dropwise to obtain a precipitation of nickel-cobalt-manganese complex hydroxide. The obtained precipitation is washed with water, filtered, separated and then mixed with lithium carbonate, tungsten (VI) oxide and zirconium (IV) oxide so that Li:(Ni+Co+Mn):W:Zr becomes 1.07:1:0.004:0.005 (a molar ratio) to obtain a mixed raw material. The obtained mixed raw material is calcined under the atmosphere at 885° C. for 15 hours to obtain a sintered body. The obtained sintered body is ground and subjected to dry sieving to obtain a lithium transition metal complex oxide represented by a composition formula $Li_{1.07}Ni_{0.4}Co_{0.3}Mn_{0.3}W_{0.004}Zr_{0.005}O_2$.

The lithium transition metal complex oxide and boric acid (orthoboric acid, $H_3BO_3$) as the raw material compound of the boron compound is mixed by means of a high-speed shear-type mixer so that a ratio of boron element to the lithium transition metal complex oxide is 0.5 mol % to obtain a mixture. The obtained mixture is calcined under the atmosphere at 250° C. for 10 hours to obtain a positive electrode composition of Example 1.

Example 2

A positive electrode composition of Example 2 is obtained in the same manner as that in Example 1, except for mixing the lithium transition metal complex oxide and boric acid (orthoboric acid) so that a ratio of boron element to the lithium transition metal complex oxide is 1.0 mol %.

Example 3

A positive electrode composition of Example 3 is obtained in the same manner as that in Example 1, except for mixing the precipitation of nickel-cobalt-manganese complex hydroxide with lithium carbonate, tungsten (VI) oxide and zirconium (IV) oxide so that Li:(Ni+Co+Mn):W:Zr becomes 1.21:1:0.004:0.005 (a molar ratio) and obtaining a lithium transition metal complex oxide represented by a composition formula $Li_{1.21}Ni_{0.4}Co_{0.3}Mn_{0.3}W_{0.004}Zr_{0.005}O_2$.

Example 4

A positive electrode composition of Example 4 is obtained in the same manner as that in Example 1, except for mixing the precipitation of nickel-cobalt-manganese complex hydroxide with lithium carbonate, tungsten (VI) oxide and zirconium (IV) oxide so that Li:(Ni+Co+Mn):W:Zr becomes 1.00:1:0.004:0.005 (a molar ratio) and obtaining a lithium transition metal complex oxide represented by a composition formula $Li_{1.00}Ni_{0.4}Co_{0.3}Mn_{0.3}W_{0.004}Zr_{0.005}O_2$.

Example 5

In a reaction vessel, pure water is prepared with stirring, and aqueous solutions of nickel sulfate, cobalt sulfate and manganese sulfate are added dropwise at a flow rate ratio such that a molar ratio of nickel, cobalt and manganese is Ni:Co:Mn=5:1:4. After completion of the dropwise addition, a liquid temperature is adjusted to 50° C. and a given amount of an aqueous sodium hydroxide solution is added dropwise to obtain a precipitation of nickel-cobalt-manganese complex hydroxide. The obtained precipitation is washed with water, filtered, separated and then mixed with lithium carbonate, tungsten (VI) oxide and zirconium (IV) oxide so that Li:(Ni+Co+Mn):W:Zr becomes 1.21:1:0.005:0.005 (a molar ratio) to obtain a mixed raw material. The obtained mixed raw material is calcined under the atmosphere at 885° C. for 15 hours to obtain a sintered body. The obtained sintered body is ground and subjected to dry sieving to obtain a lithium transition metal complex oxide represented by a composition formula $Li_{1.21}Ni_{0.5}Co_{0.1}Mn_{0.4}W_{0.005}Zr_{0.005}O_2$.

The lithium transition metal complex oxide and boric acid (orthoboric acid) as the raw material compound of the boron compound is mixed by means of a high-speed shear-type mixer so that a ratio of boron element to the lithium transition metal complex oxide is 0.5 mol % to obtain a mixture. The obtained mixture is calcined under the atmosphere at 250° C. for 10 hours to obtain a positive electrode composition of Example 5.

Example 6

A positive electrode composition of Example 6 is obtained in the same manner as that in Example 5, except for mixing the lithium transition metal complex oxide and boric acid (orthoboric acid) so that a ratio of boron element to the lithium transition metal complex oxide is 1.0 mol %.

Example 7

A positive electrode composition of Example 7 is obtained in the same manner as that in Example 5, except for mixing the lithium transition metal complex oxide and boric acid (orthoboric acid) so that a ratio of boron element to the lithium transition metal complex oxide is 0.25 mol %.

Example 8

A positive electrode composition of Example 8 is obtained in the same manner as that in Example 5, except for mixing the precipitation of nickel-cobalt-manganese complex hydroxide with lithium carbonate, tungsten (VI) oxide and zirconium (IV) oxide so that Li:(Ni+Co+Mn):W:Zr becomes 1.07:1:0.005:0.005 (a molar ratio) and obtaining a lithium transition metal complex oxide represented by a composition formula $Li_{1.07}Ni_{0.5}Co_{0.1}Mn_{0.4}W_{0.005}Zr_{0.005}O_2$.

Example 9

A positive electrode composition of Example 9 is obtained in the same manner as that in Example 5, except for using $LiBO_2$ in place of boric acid (orthoboric acid).

Example 10

The lithium transition metal complex oxide is obtained in the same manner as that in Example 5. The obtained lithium transition metal complex oxide and boric acid as the raw material compound of the boron compound is mixed by means of a high-speed shear-type mixer so that a ratio of boron element to the lithium transition metal complex oxide is 0.5 mol % to obtain a positive electrode composition of Example 10.

Example 11

In a reaction vessel, pure water is prepared with stirring, and aqueous solutions of nickel sulfate, cobalt sulfate and aluminum sulfate are added dropwise at a flow rate ratio such that a molar ratio of nickel, cobalt and aluminum is Ni:Co:Al=8.15:1.55:0.30. After completion of the dropwise addition, a liquid temperature is adjusted to 50° C. and a given amount of an aqueous sodium hydroxide solution is added dropwise to obtain a precipitation of nickel-cobalt-aluminum complex hydroxide. The obtained precipitation is washed with water, filtered, separated and then mixed with lithium carbonate, tungsten (VI) oxide and zirconium (IV) oxide so that Li:(Ni+Co+Al):W:Zr becomes 1.10:1:0.004:0.005 (a molar ratio) to obtain a mixed raw material. The obtained mixed raw material is calcined under the atmosphere at 885° C. for 15 hours to obtain a sintered body. The obtained sintered body is ground and subjected to dry sieving to obtain a lithium transition metal complex oxide represented by a composition formula $Li_{1.10}Ni_{0.815}Co_{0.155}Mn_{0.030}W_{0.004}Zr_{0.005}O_2$.

The obtained lithium transition metal complex oxide and boric acid (orthoboric acid) is mixed by means of a high-speed shear-type mixer so that a ratio of boron element to the lithium transition metal complex oxide is 1.0 mol % to obtain a mixture. The obtained mixture is calcined under the atmosphere at 250° C. for 10 hours to obtain a positive electrode composition of Example 11.

Comparative Example 1

The lithium transition metal complex oxide obtained by the same manner as that in Example 1 is used as a positive electrode composition of Comparative Example 1.

Comparative Example 2

The lithium transition metal complex oxide obtained by the same manner as that in Example 3 is used as a positive electrode composition of Comparative Example 2.

Comparative Example 3

The lithium transition metal complex oxide obtained by the same manner as that in Example 4 is used as a positive electrode composition of Comparative Example 3.

Comparative Example 4

The lithium transition metal complex oxide obtained by the same manner as that in Example 5 is used as a positive electrode composition of Comparative Example 4.

Comparative Example 5

The lithium transition metal complex oxide obtained by the same manner as that in Example 8 is used as a positive electrode composition of Comparative Example 5.

Comparative Example 6

The lithium transition metal complex oxide obtained by the same manner as that in Example 11 is used as a positive electrode composition of Comparative Example 6.

Comparative Example 7

The precipitation of nickel-cobalt-manganese complex hydroxide is obtained in the same manner as that in Example 1. The obtained precipitation is washed with water, filtered, separated and then mixed with lithium carbonate and zirconium (IV) oxide so that Li:(Ni+Co+Mn):Zr becomes 1.07:1:0.005 (a molar ratio) to obtain a mixed raw material. The obtained mixed raw material is calcined under the atmosphere at 885° C. for 15 hours to obtain a sintered body. The obtained sintered body is ground and subjected to dry sieving to obtain a lithium transition metal complex oxide represented by a composition formula $Li_{1.07}Ni_{0.4}Co_{0.3}Mn_{0.3}Zr_{0.005}O_2$. This lithium transition metal complex oxide is used as a positive electrode composition of Comparative Example 7.

Comparative Example 8

A positive electrode composition of Comparative Example 8 is obtained in the same manner as that in Example 1, except for using $TiB_2$ in place of boric acid (orthoboric acid) so that a ratio of boron element to the lithium transition metal complex oxide is 0.5 mol %.

Comparative Example 9

A positive electrode composition of Comparative Example 9 is obtained in the same manner as that in Example 1, except for using $ZrB_2$ in place of boric acid (orthoboric acid) so that a ratio of boron element to the lithium transition metal complex oxide is 0.5 mol %.

[Evaluation of Output Power Characteristics]

Using the positive electrode compositions of Examples 1 to 11 and Comparative Examples 1 to 9, batteries for evaluation are prepared according to the following procedures, and DC-IR (direct current internal resistances) of the batteries is measured in a manner as described below.

[1. Preparation of Positive Electrode]

A positive electrode slurry is prepared by dispersing 85 parts by weight of the positive electrode composition, 10 parts by weight of acetylene black as a conducting agent and 5.0 parts by weight of PVDF (polyvinylidene fluoride) as a binder in NMP as a dispersion medium. The obtained positive electrode slurry is applied on an aluminum foil, dried, compression-formed by a roll press and then cut into a given size to obtain a positive electrode.

[2. Preparation of Negative Electrode]

A negative electrode slurry is prepared by dispersing 97.5 parts by weight of artificial graphite, 1.5 parts by weight of CMC (carboxymethyl cellulose) as a thickening agent and 1.0 parts by weight of SBR (styrene-butadiene rubber) as a binder in water as a dispersion medium. The obtained negative electrode slurry is applied on a copper foil, dried, compression-formed by a roll press and then cut into a given size to obtain a negative electrode.

[3. Preparation of Nonaqueous Electrolyte]

EC (ethylene carbonate) and MEC (methylethyl carbonate) are mixed with each other at a volume ratio of 3:7 to obtain a solvent. Lithium hexafluorophosphate ($LiPF_6$) is dissolved in the obtained mixed solvent so that the concentration becomes 1 mol/l to obtain a nonaqueous electrolyte.

[4. Fabrication of Battery for Evaluation]

Lead electrodes are respectively attached to current collectors of the aforementioned positive and negative electrodes, followed by vacuum drying at 120° C. Then, a separator made of porous polyethylene is provided between the positive electrode and the negative electrode, and they are placed in a bag-shaped laminate pack. After that, moisture adsorbed to each member is removed by vacuum drying at 60° C. After vacuum drying, the aforementioned nonaqueous electrolyte is injected into the laminate pack, followed by sealing to obtain a laminate-type nonaqueous electrolyte secondary battery for evaluation.

[5. Measurement of DC-IR]

The obtained battery is aged with applying a micro current thereby allowing the electrolyte to permeate sufficiently into the positive and negative electrodes. Then, discharging with high current and charging with micro current are repeatedly alternated. The charging capacity at 10th charging is regarded as a total charging capacity of the battery. After 10th discharging, the battery is charged to 40% of the total charging capacity. After charging, the battery is disposed in a constant temperature bath set at −25° C. After leaving for six hours, the battery is discharged with 0.02 A, 0.04 A and 0.06 A, and the voltage is measured with respect to each current. Points at the intersections of the currents on the abscissa and the voltages on the ordinate are plotted, and a slope of a straight line connecting the points is regarded as DC-IR. Lower DC-IR means good output power characteristics.

With respect to the batteries for evaluation obtained by using the positive electrode compositions of Comparative Examples 8 using $TiB_2$ as the raw material compound of the boron compound and Comparative Example 9 using $ZrB_2$ as the raw material compound of the boron compound, the evaluation of output power characteristics could not be performed since a behavior which appears to be a short-circuit was observed upon charging. The cause of the occurrence of the behavior which appears to be a short-circuit is considered that titanium or zirconium contained in the boron compound is eluted into the electrolyte, and the eluted titanium or zirconium is reprecipitated on the negative electrode, and the reprecipitated titanium or zirconium causes the short-circuit.

[Viscosity Measurement of Positive Electrode Slurry]

With respect to the positive electrode compositions of Examples 1 to 11 and Comparative Examples 1 to 7, a viscosity of the positive electrode slurry is measured in the following manner.

[1. Measurement of Initial Viscosity]

30 g of a positive electrode composition, 1.57 g of PVDF and 12.48 g of NMP are placed in a 150 ml polyethylene container and kneaded at a normal temperature (about 25° C.) for 5 minutes. After kneading, the viscosity of the obtained slurry is immediately measured by an E-type viscometer. The measurement is carried out using a corn plate-type blade at a rotary speed of a rotor of 5 rpm. Thus, a measured value of an initial viscosity is obtained.

[2. Evaluation of Viscosity Change]

Next, the slurry in the polyethylene container is left in a constant temperature bath at 60° C., and the viscosity is measured after 24 hours and 48 hours. Before the respective measurements, the slurry is kneaded at a normal temperature for 2 minutes.

[Evaluation of Cycling Characteristics]

With respect to the positive electrode compositions of Examples 1 to 11 and Comparative Examples 1 to 9, cycling characteristics are measured in the following manner.

A secondary battery for evaluation prepared in the same manner as that for the battery for evaluating the output power characteristics is aged with a micro current thereby allowing the electrolyte to permeate sufficiently into the positive and negative electrodes. After aging, the battery is disposed in a constant temperature bath set at 20° C., and charge-discharge is carried out repeatedly in which the charging with a charging potential of 4.2 V and a charging current of 1.0 C (1 C is defined as a current with which discharging is completed in one hour) and the discharging with a discharging potential of 2.75 V and a discharging current of 1.0 C are regarded as one cycle. A value (%) of the discharging capacity at nth cycle divided by the discharging capacity at 1st cycle is regarded as a discharging capacity retention (QsR) at nth cycle. Higher discharging capacity retention means good cycling characteristics.

With respect to the positive electrode compositions of Comparative Examples 8 and 9, the evaluation of cycling characteristics could not be performed since a behavior which appears to be a short-circuit was observed upon charging.

Composition formulae (shown as "Composition A" in Table 1) of the lithium transition metal complex oxide of Examples 1 to 11 and Comparative Examples 1 to 9, composition formulae of the raw material compounds of boron compound (shown as "Composition B" in Table 1) and boron contents in the positive electrode compositions (shown as "B content" in Table 1 and FIG. 1) are shown in Table 1, and DC-IR(R), viscosity (v) of the positive electrode slurry and the discharging capacity retention (QsR) after 100th cycle are shown in Table 2.

TABLE 1

|  | Composition A | Composition B | Calcination Temperature/ ° C. | B content/ mol % |
|---|---|---|---|---|
| Example 4 | $Li_{1.00}Ni_{0.4}Co_{0.3}Mn_{0.3}W_{0.004}Zr_{0.005}O_2$ | $H_3BO_3$ | 250 | 0.5 |
| Comparative Example 3 | — | — | — | — |
| Example 1 | $Li_{1.07}Ni_{0.4}Co_{0.3}Mn_{0.3}W_{0.004}Zr_{0.005}O_2$ | $H_3BO_3$ | 250 | 0.5 |
| Example 2 |  |  |  | 1.0 |
| Comparative Example 1 |  | — | — | — |
| Comparative Example 8 |  | $TiB_2$ | 250 | 0.5 |
| Comparative Example 9 |  | $ZrB_2$ |  |  |
| Comparative Example 7 | $Li_{1.07}Ni_{0.4}Co_{0.3}Mn_{0.3}Zr_{0.005}O_2$ | $H_3BO_3$ | 250 | 0.5 |
| Example 3 | $Li_{1.21}Ni_{0.4}Co_{0.3}Mn_{0.3}W_{0.004}Zr_{0.005}O_2$ |  |  |  |
| Comparative Example 2 |  | — | — | — |
| Example 8 | $Li_{1.07}Ni_{0.5}Co_{0.1}Mn_{0.4}W_{0.005}Zr_{0.005}O_2$ | $H_3BO_3$ | 250 | 0.5 |
| Comparative Example 5 |  | — | — | — |

TABLE 1-continued

| | Composition A | Composition B | Calcination Temperature/ °C. | B content/ mol % |
|---|---|---|---|---|
| Example 7 | $Li_{1.21}Ni_{0.5}Co_{0.1}Mn_{0.4}W_{0.005}Zr_{0.005}O_2$ | $H_3BO_3$ | 250 | 0.25 |
| Example 5 | | | | 0.5 |
| Example 6 | | | | 1.0 |
| Example 9 | | $LiBO_2$ | | 0.5 |
| Example 10 | | $H_3BO_3$ | — | |
| Comparative Example 4 | | — | — | — |
| Example 11 | $Li_{1.10}Ni_{0.815}Co_{0.155}Al_{0.030}W_{0.004}Zr_{0.005}O_2$ | $H_3BO_3$ | 250 | 1.0 |
| Comparative Example 6 | $Li_{1.10}Ni_{0.815}Co_{0.155}Al_{0.030}W_{0.004}Zr_{0.005}O_2$ | — | — | — |

TABLE 2

| | R/Ω | v/mPa · s | | | QsR/% after 100th cycle |
|---|---|---|---|---|---|
| | | after 0 hour | after 24 hours | after 48 hours | |
| Example 4 | 16.1 | 8230 | 8660 | 8330 | 89.1 |
| Comparative Example 3 | 18.0 | 4260 | 6880 | 11900 | 82.2 |
| Example 1 | 13.0 | 11800 | 11200 | 11300 | 90.4 |
| Example 2 | 13.4 | 13700 | 11400 | 11400 | 91.6 |
| Comparative Example 1 | 14.7 | 4680 | 40000* | 40000* | 86.9 |
| Comparative Example 8 | n.d. | n.d. | n.d. | n.d. | n.d. |
| Comparative Example 9 | n.d. | n.d. | n.d. | n.d. | n.d. |
| Comparative Example 7 | 16.6 | 14400 | 12400 | 12300 | 90.0 |
| Example 3 | 13.0 | 5720 | 6040 | 5700 | 95.9 |
| Comparative Example 2 | 13.6 | 6140 | 14200 | 29000 | 91.0 |
| Example 8 | 28.5 | 26400 | 28500 | 40000* | 90.9 |
| Comparative Example 5 | 31.1 | 21000 | 40000* | 40000* | 85.8 |
| Example 7 | 22.7 | 17100 | 19500 | 19300 | 96.2 |
| Example 5 | 21.0 | 21600 | 23000 | 21800 | 96.6 |
| Example 6 | 22.8 | 22600 | 23300 | 21500 | n.d. |
| Example 9 | 23.7 | 8780 | 17100 | 20000 | 95.2 |
| Example 10 | 21.4 | 16200 | 16700 | 16900 | 98.5 |
| Comparative Example 4 | 25.6 | 13000 | 40000* | 40000* | 92.6 |
| Example 11 | 12.8 | 5230 | 16500 | 27400 | 98.4 |
| Comparative Example 6 | 13.4 | 40000* | 40000* | 40000* | 98.1 |

*upper measurement limit
n.d.: not determined

As is apparent from Tables 1 and 2, the positive electrode composition of Comparative Example 7 comprising the lithium transition metal complex oxide not comprising tungsten and the boron compound comprising at least boron element and oxygen element exhibit lower output power characteristics compared to the positive electrode composition of Example 1 comprising the lithium transition metal complex oxide comprising tungsten and the boron compound comprising at least boron element and oxygen element. On the other hand, the positive electrode composition of Comparative Example 1 comprising only the lithium transition metal complex oxide comprising tungsten exhibits improved output power characteristics, but reduced cycling characteristics, compared to the positive electrode composition of Comparative Example 7. In contrast, it can be seen that the positive electrode composition of Example 1 comprising the lithium transition metal complex oxide comprising tungsten and the boron compound comprising at least boron element and oxygen element exhibits improved output power characteristics as well as improved cycling characteristics compared to the positive electrode composition of Comparative Example 7. In addition, as is apparent from Tables 1 and 2, the positive electrode composition of Example 1 can suppress the increase in viscosity of the positive electrode slurry compared to the positive electrode compositions of Comparative Examples 1 and 7.

Figure 1:
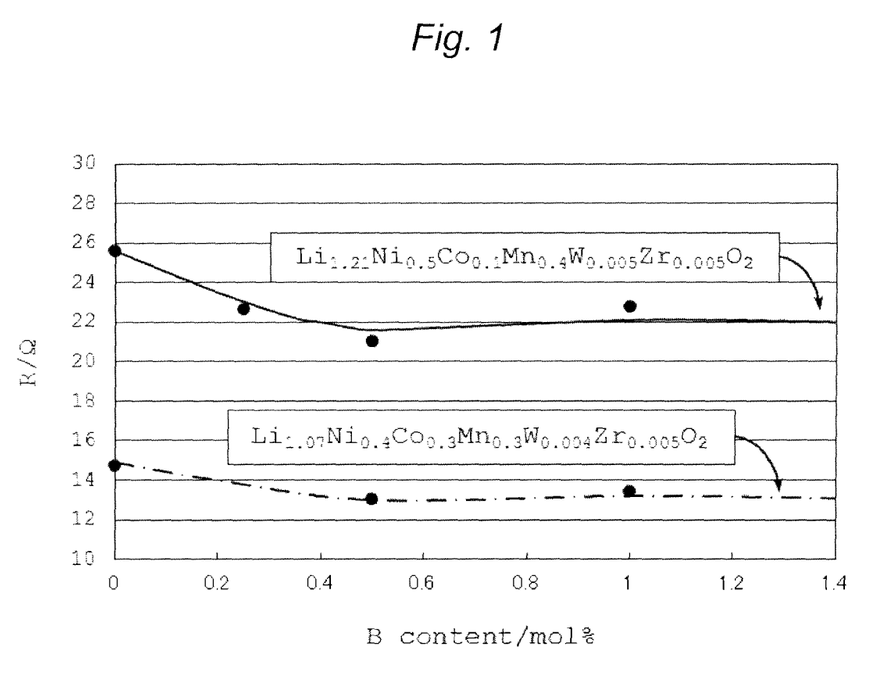
FIG. 1 shows a relation between a content of boron compound in positive electrode compositions and DC-IR (direct current internal resistances) at −25° C.

FIG. 1 shows a relation between the boron content in the positive electrode compositions and DC-IR (R) with respect to Examples 1 and 2 and Comparative Example 1 using the lithium transition metal complex oxide represented by the composition formula $Li_{0.7}Ni_{0.4}Co_{0.3}Mn_{0.3}W_{0.004}Zr_{0.005}O_2$ as well as Examples 5 to 7 and Comparative Example 4 using the lithium transition metal complex oxide represented by the composition formula $Li_{1.21}Ni_{0.5}Co_{0.1}Mn_{0.4}W_{0.005}Zr_{0.005}O_2$. As is apparent from FIG. 1, the output power characteristics is improved by using a positive electrode composition comprising a boron compound comprising at least boron element and oxygen element, compared to the case of using the lithium transition metal complex oxide alone. The output power characteristics is more improved as the boron content is increased, and the output power characteristics becomes constant when the boron content is about 0.5 mol % or more. Therefore, it can be seen that sufficient effect can be achieved when the boron content is about 0.5 mol % or more.

With respect to the results of DC-IR measurements shown in Table 2, the effect in improving the output power characteristics due to the positive electrode composition comprising the boron compound is also confirmed in the other compositions of lithium transition metal complex oxide, from comparisons between Example 3 and Comparative Example 2, between Example 4 and Comparative Example 3, between Example 8 and Comparative Example 5 and between Example 11 and Comparative Example 6.

In addition, as is apparent from Table 1, the lithium transition metal complex oxide represented by the composition formula $Li_{1.21}Ni_{0.5}Co_{0.1}Mn_{0.4}W_{0.005}Zr_{0.005}O_2$ (Comparative Example 4) has lower output power characteristics compared to the lithium transition metal complex oxide represented by the composition formula $Li_{1.07}Ni_{0.4}Co_{0.3}Mn_{0.3}W_{0.004}Zr_{0.005}O_2$ (Comparative Example 1). It can be seen from FIG. 1 that Example 5 using the lithium transition metal complex oxide exhibiting relatively lower output power characteristics has higher effect in improving the output power characteristics due to adding the boron compound, compared to the lithium transition metal complex oxide exhibiting relatively higher output power characteristics, when the boron content is the same.

Figure 2:
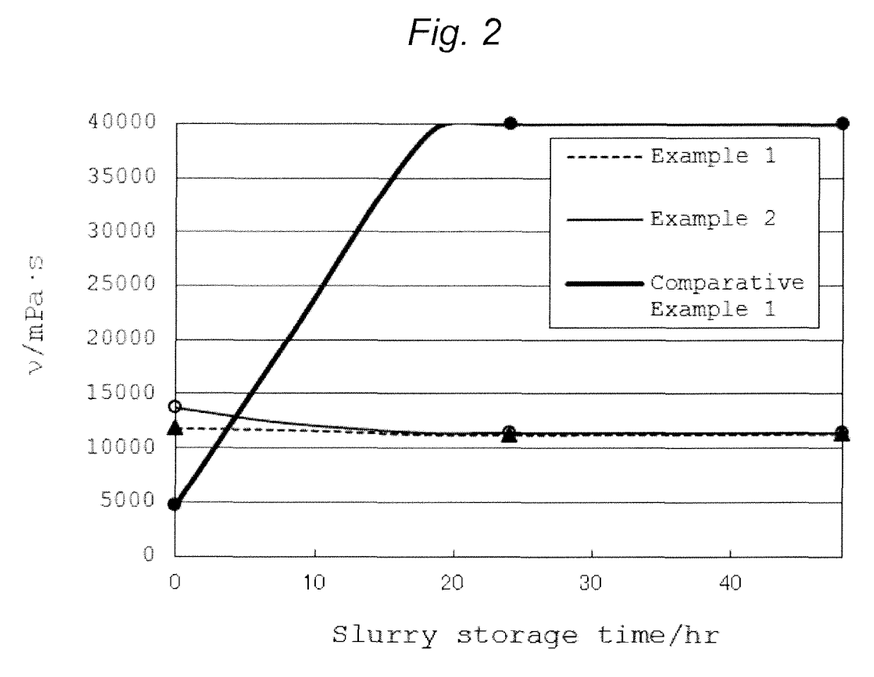
FIG. 2 shows a time-dependent change in viscosity of positive electrode slurries prepared by using positive electrode compositions comprising different amount of boron compound.
Figure 3:
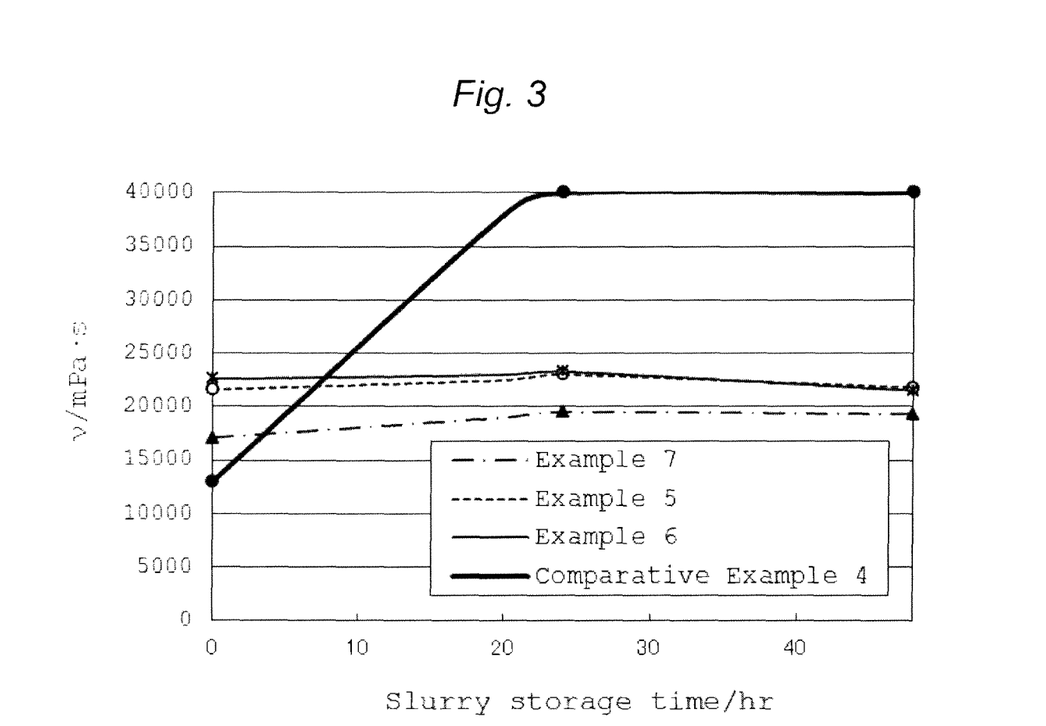
FIG. 3 shows a time-dependent change in viscosity of positive electrode slurries prepared by using positive electrode compositions comprising different amount of boron compound.

FIG. 2 shows a time-dependent change in viscosity of the positive electrode slurries of Examples 1 and 2 and Comparative Example 1, and FIG. 3 shows a time-dependent change in viscosity of the positive electrode slurries of Examples 5 to 7 and Comparative Example 4. As is apparent from FIGS. 2 and 3, the increase in viscosity can be suppressed by using the positive electrode composition comprising the boron compound comprising at least boron element and oxygen element in the positive electrode slurry, compared to the case of using the lithium transition metal complex oxide alone as the positive electrode composition.

Figure 4:
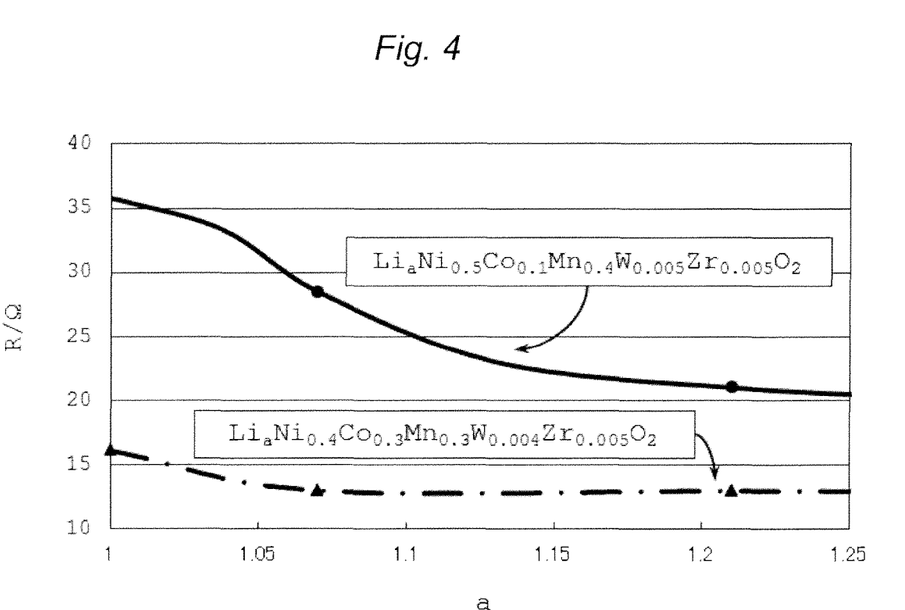
FIG. 4 shows a relation between values of a in composition formulae of lithium transition metal complex oxides and DC-IR at −25° C.

FIG. 4 shows a relation between the value of a and DC-IR (R) with respect to the positive electrode compositions of Examples 1, 3 and 4 comprising the lithium transition metal complex oxide represented by the composition formula $Li_aNi_{0.4}Co_{0.3}Mn_{0.3}W_{0.004}Zr_{0.005}O_2$, as well as the positive electrode compositions of Examples 5 and 8 comprising the lithium transition metal complex oxide represented by the composition formula $Li_aNi_{0.5}Co_{0.1}Mn_{0.4}W_{0.005}Zr_{0.005}O_2$. As can be apparent from FIG. 4, the output power characteristics is more improved as the value of a is increased, in both composition of the lithium transition metal complex oxides. In addition, it can be seen from FIG. 4 that the output power characteristics is significantly improved when the value of a exceeds about 1.05.

Figure 5:
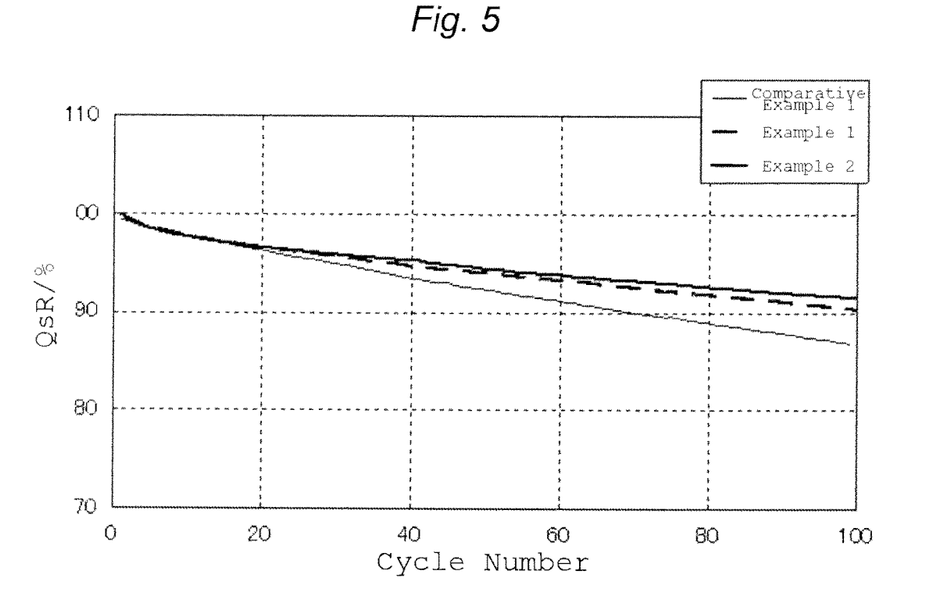
FIG. 5 shows a correlation between the contents of boron compound in positive electrode compositions and cycling characteristics.

FIG. 5 shows the cycling characteristics with respect to Examples 1 and 2 and Comparative Example 1. As is apparent from FIG. 5, the cycling characteristics is improved by using the positive electrode composition comprising the boron compound comprising at least boron element and oxygen element, compared to the case of using the lithium transition metal complex oxide alone as the positive electrode composition. In addition, it can be seen that such effect becomes higher as the boron content is increased.

As can be seen from Tables 1 and 2, the positive electrode composition of Example 9 using $LiBO_2$ as the raw material compound of the boron compound exhibits improved output power characteristics and cycling characteristics compared to the positive electrode composition of Comparative Example 4 not comprising the boron compound. In addition, it can be seen that the positive electrode composition of Example 9 exhibits lower output power characteristics and cycling characteristics compared to the positive electrode composition of Example 5 using boric acid (orthoboric acid) as the raw material compound of the boron compound. On the other hand, it can be seen that the effect in suppressing the increase in viscosity of the positive electrode slurry is slightly higher in the positive electrode composition of Example 9 than that of Example 5. Therefore, it can be seen that boric acid is more preferable for the raw material compound of the boron compound.

As is apparent from Tables 1 and 2, the positive electrode composition of Example 10 in which the calcination is not performed after mixing the lithium transition metal complex oxide and the raw material compound of the boron compound exhibits improved output power characteristics and cycling characteristics as well as higher effect in suppressing the increase in viscosity of the positive electrode slurry compared to the positive electrode composition of Comparative Example 4 not comprising the boron compound. This reveals that the effects of the present invention can be achieved even when the calcination is not performed.

INDUSTRIAL APPLICABILITY

By using the positive electrode composition of the present invention, the nonaqueous electrolyte secondary battery can achieve both of higher output power characteristics and higher cycling characteristics. In addition, the yield and the operability are improved since the increase in viscosity of the positive electrode slurry is suppressed. Therefore, the nonaqueous electrolyte secondary battery using the positive electrode composition of the present invention can achieve low cost as well as high output power characteristics and cycling characteristics, and thus, can be particularly suited for use not only in mobile devices such as a mobile phone, a note PC and a digital camera, but also in a high-output power supply for large-size applications such as a battery for an electric vehicle.

What is claimed is:

1. A positive electrode composition for a nonaqueous electrolyte secondary battery, the positive electrode composition comprising:
    a lithium transition metal complex oxide represented by a general formula $Li_aNi_{1-x-y}Co_xMn_yW_zZr_wO_2$ (wherein $1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$); and
    a boron compound comprising at least boron element and oxygen element,
    wherein the boron compound is obtained by at least mixing the lithium transition metal complex oxide and a raw material compound of the boron compound,
    wherein the raw material compound of the boron compound is orthoboric acid, and
    wherein a ratio of the boron element to the lithium transition metal complex oxide is in a range of 0.5 mol % to 1.5 mol %.

2. The positive electrode composition according to claim 1, wherein the boron compound is obtained by mixing the lithium transition metal complex oxide and the raw material compound of the boron compound followed by calcining.

3. The positive electrode composition according to claim 2, wherein a calcination temperature in the calcining is 450° C. or less.

4. The positive electrode composition according to claim 1, wherein the lithium transition metal complex oxide is in the form of particles, and at least portion of the boron compound exists on a surface of the particles of the lithium transition metal complex oxide.

5. The positive electrode composition according to claim 4, wherein at least portion of the boron compound covers at least partially the surface of the particles of the lithium transition metal complex oxide.

6. The positive electrode composition according to claim 1, wherein at least portion of the boron compound is chemically bonded to one or more elements constituting the lithium transition metal complex oxide.

7. A nonaqueous electrolyte secondary battery comprising a positive electrode, the positive electrode comprising the positive electrode composition according to claim 1.

8. A method for producing a positive electrode composition for a nonaqueous electrolyte secondary battery, the positive electrode composition comprising a lithium transition metal complex oxide represented by a general formula $Li_aNi_{1-x-y}Co_xMn_yW_zZr_wO_2$ (wherein $1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$), and a boron compound comprising at least boron element and oxygen element, the method comprising at least:
    synthesizing the lithium transition metal complex oxide; and
    mixing the lithium transition metal complex oxide obtained by the synthesis and a raw material compound of the boron compound to obtain a mixture, wherein the raw material compound of the boron compound is orthoboric acid, and wherein the lithium transition metal complex oxide and the raw material compound of the boron compound are mixed such that a ratio of the boron element to the lithium transition metal complex oxide is in a range of 0.5 mol % to 1.5 mol %.

9. The method according to claim 8, further comprising calcining the mixture.

10. The method according to claim 9, wherein a calcination temperature in the calcining is 450° C. or less.

* * * * *